United States Patent

Chun et al.

[11] Patent Number: 6,055,904
[45] Date of Patent: May 2, 2000

[54] SHUT HEIGHT ADJUSTMENT AND CRANK SUPPORT ARRANGEMENTS AND METHODS FOR A THERMOFORMING PRESS

[75] Inventors: Victor L. Chun, Midland; Albert W. Arends, Gladwin, both of Mich.

[73] Assignee: Brown Machine, LLC, Beaverton, Mich.

[21] Appl. No.: 09/221,746

[22] Filed: Dec. 28, 1998

[51] Int. Cl.[7] .................................................... B30B 5/00
[52] U.S. Cl. ............................ 100/257; 83/529; 72/448
[58] Field of Search .............................. 100/257; 83/530, 83/529; 72/446, 448; 425/394

[56] References Cited

U.S. PATENT DOCUMENTS

| | | | |
|---|---|---|---|
| 3,400,625 | 9/1968 | Wrona | 100/257 |
| 3,858,432 | 1/1975 | Voorhees et al. | 100/257 |
| 4,024,807 | 5/1977 | Karsen | 100/257 |
| 5,002,479 | 3/1991 | Brown et al. | 100/257 |
| 5,349,902 | 9/1994 | Daniel et al. | 100/257 |

*Primary Examiner*—Peter Vo
*Assistant Examiner*—Louis L. Huynh
*Attorney, Agent, or Firm*—John R. Benefiel

[57] ABSTRACT

A thermoforming press in which the shut height of upper and lower platens is adjustable by a keyed connection between a press frame top assembly and each of four posts of the frame established by pieces which are movable and which also act as cams to raise or lower the frame top assembly, moving the upper platen therewith to vary the shut height. The movable pieces are moved in unison by a drive motor to insure uniform movement of the frame top assembly. The platens are driven by rotary crank plates, which are in turn driven by rotary output shafts of right angle drives. Pairs of rollers engage the perimeter of each crank plate on one side to resist bending loads on each shaft.

5 Claims, 7 Drawing Sheets

SHUT HEIGHT ADJUSTMENT AND CRANK SUPPORT ARRANGEMENTS AND METHODS FOR A THERMOFORMING PRESS

BACKGROUND OF THE INVENTION

This invention concerns presses, particularly presses used in thermoforming operations. Such presses include movable platens which mount forming dies, the dies overlain with one or more sheets of plastic to be formed into a part by the application of fluid pressure. The fluid pressure expands the central portions of the heated sheets into conformity with the contours of die cavities. The perimeter of the sheet is engaged by surfaces of the dies brought into contact with the sheet after the platens are moved together.

The platens are each driven by drive mechanisms to a closed position where there is a minimum separation distance between the platens, referred to as a "shut height" of the press. It is necessary to adjust the shut height position of the platens for different part applications. Where the drive mechanism has a maximum extended position which cannot be varied, as in a crank drive, some other means must be provided for adjustment of the shut height.

Wedge adjustments have been provided, in which tapered pieces are interposed between the die and the platen, as described in U.S. Pat. Nos. 3,889,515 and 3,489,049.

Wedge slides have also been used in combination with a linkage drive for the platens, as described in U.S. Pat. No. 4,133,260.

See also U.S. Pat. No. 5,814,185 issued to the assignee of the present application which uses threaded shafts and chain driven nuts to adjust the closed platen position.

Wedge structures associated with the dies are not practical with very large dies due to the difficulties in precisely maintaining parallelism between the upper and lower dies.

Another disadvantage of many of the wedge arrangements is that shut down of the machine is necessary to make adjustments.

Many platen drives utilize linkage systems which must be reversed after reaching a dead center position, which drive reversal increases the press cycling time and complicates the controls.

It has been proposed to utilize a unidirectional crank drive for thermoforming presses. However, the use of eccentric or crank drives inherently creates an overhang condition of the drive shaft used to rotate a crank plate. Very large loads are typically generated in thermoforming presses since the fluid pressure used to form the part is exerted over a large area, and the resulting large forces must be withstood by the shafts driving the crank plates. Since the shafts are necessarily cantilevered out from the drive unit, excessive bending of the cantilevered shaft is likely to occur.

It is an object of the present invention to provide a shut height adjustment arrangement and method for a forming press which maintains parallelism even between very large dies mounted to the platens, and which allows adjustments to be made when the machine is in operation.

It is a further object of the present invention to provide a crank drive arrangement for a thermoforming press which allows a non-reversing platen drive, but which does not result in excessive shaft bending by the large forces involved.

SUMMARY OF THE INVENTION

The above recited objects of the present invention and others which will become apparent upon a reading of the following specification and claims are achieved by a shut height adjustment arrangement and method including a mounting of the top assembly of the press frame to four corner posts so as to allow simultaneous adjusting movement of the top assembly with respect to each of the posts, carrying the upper platen up or down in parallelism with respect to the lower platen.

The post mounting includes a slide bar on each side of the press frame top assembly, having movable cam/key pieces attached at either end, extending through angled slots in two of the posts and a straight slot in an end plate interconnecting the top to each post. The angled slots in the post each mate with a respective angled cam portion of the movable key piece such that relative vertical movement of the top assembly and posts occurs when slide bar is moved lengthwise, by a camming action between the post slots and angled cam portions.

Both slide bars are moved in unison by a common drive motor connected to simultaneously rotate a pair of power screws, each associated with a respective slide bar to cause traversing of the slider bar upon activation of the drive motor. This allows adjustments to be made while the machine is in operation.

The upper and lower platens are each driven by four rotary crank plates, each pivotally connected to one link of two pairs of links pinned to the respective upper or lower platen.

The rotary crank plates are driven in a single direction to move the upper and lower platens together and apart.

In order to prevent excessive bending of overhung right angle drive shafts rotating each crank plate, a pair of rollers are arranged on one side of each crank plate on a side remote from the connected upper or lower platen. An adjustably positioned mounting block rotatably provides a support for each roller, each block movable to bring the roller into engagement with the associated crank plate perimeter. The blocks are each adjustably positioned by an adjustment bolts engaging an end of the block, the block slotted to allow securement with shoulder bolts to accommodate limited adjusting movement.

The rollers and mounting blocks provide support for the crank plates resisting bending forces exerted thereon by the forming process.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
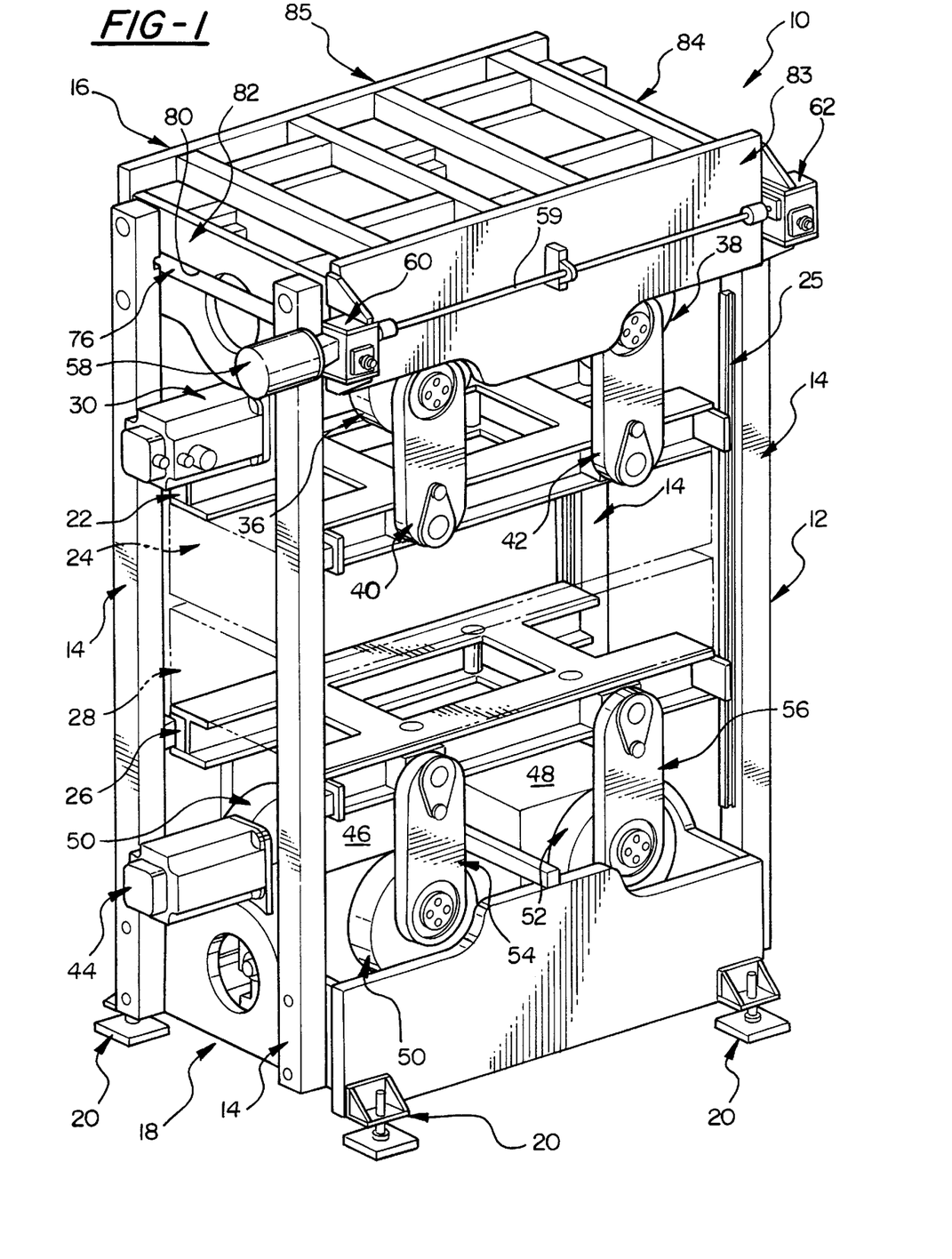
FIG. 1 is a perspective view of thermoforming forming station press incorporating the arrangements according to the present invention.

Referring to FIG. 1, a forming press 10 is shown, which includes a press frame 12 formed by four posts 14, a top assembly 16 and a bottom assembly 18 both connected to the four posts 14.

The press 10 rests on levelers 20 at each corner in conventional fashion.

An upper platen 22 is adapted to mount an upper die 24 (outlined in phantom) and a lower platen 26 is adapted to mount a lower die 28, outlined in phantom.

The platens 22 and 26 are mounted by linear guide bearings 25 on the posts 14 for vertical reciprocating movement between open and closed positions.

Figure 2:
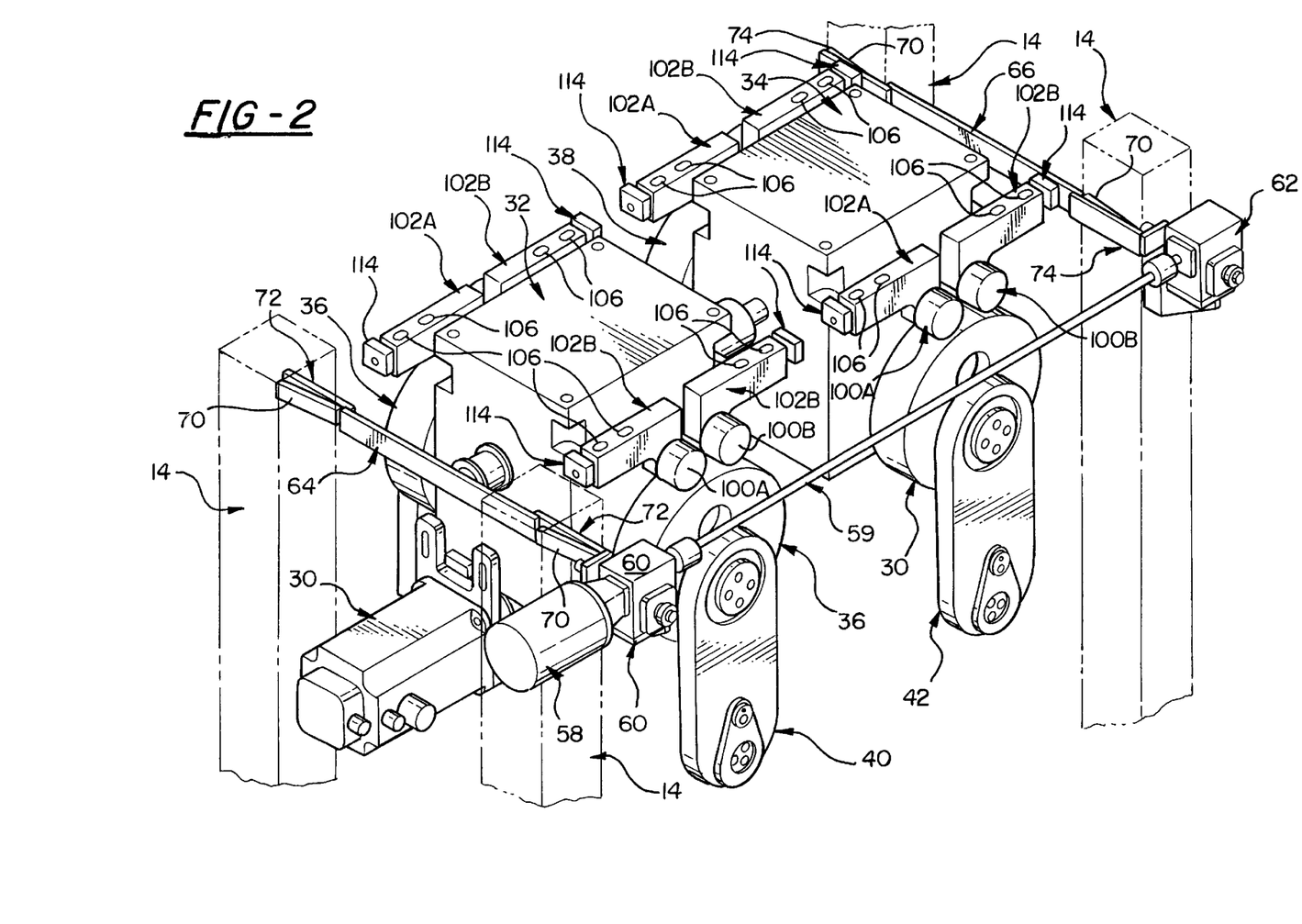
FIG. 2 is a perspective view of certain components located at the top part of the press shown in FIG. 1, with the upper parts of the press frame posts shown in phantom.
Figure 3:
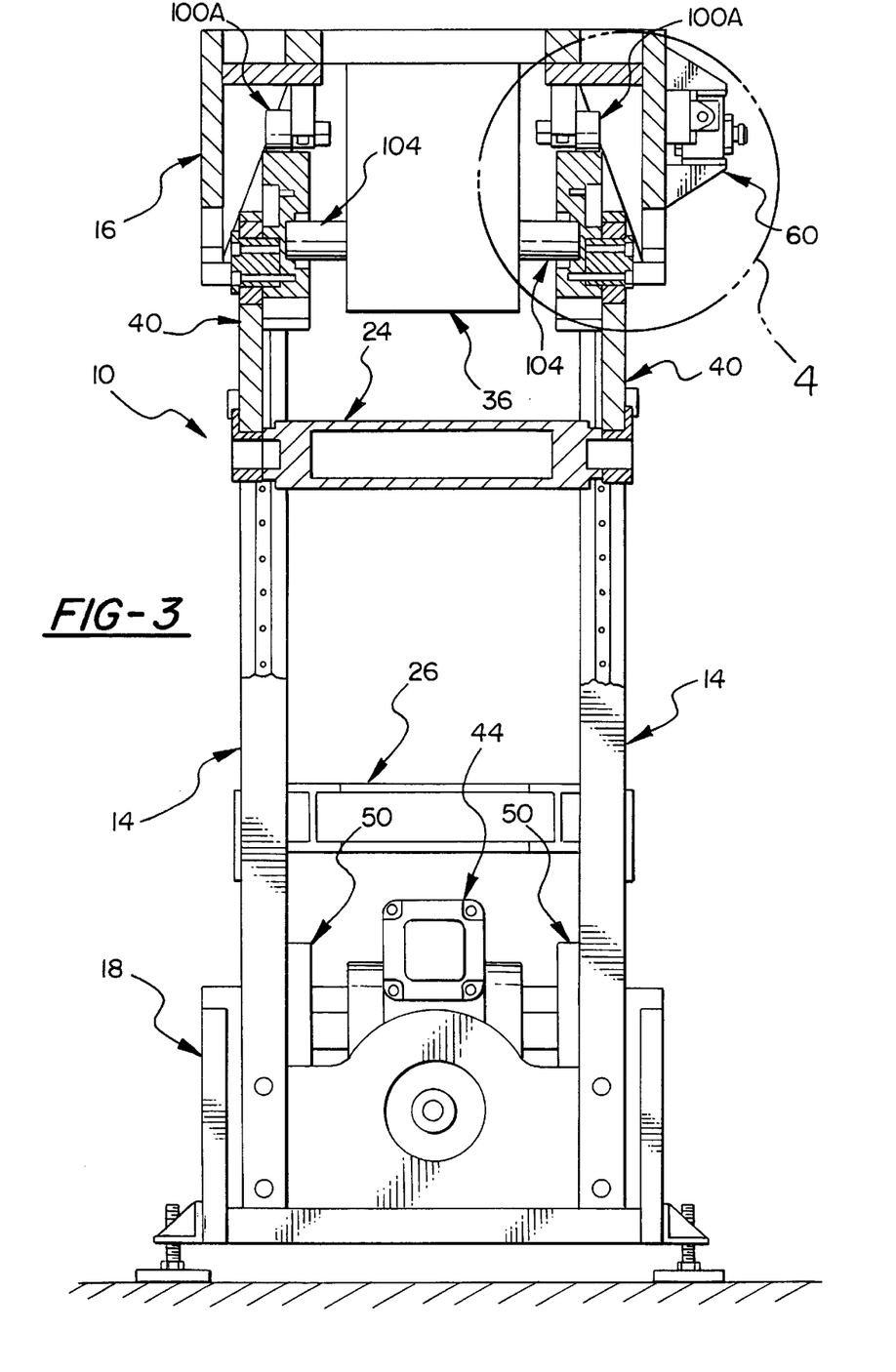
FIG. 3 is an end view of the press shown in FIG. 1, shown in partial section.
Figure 4:
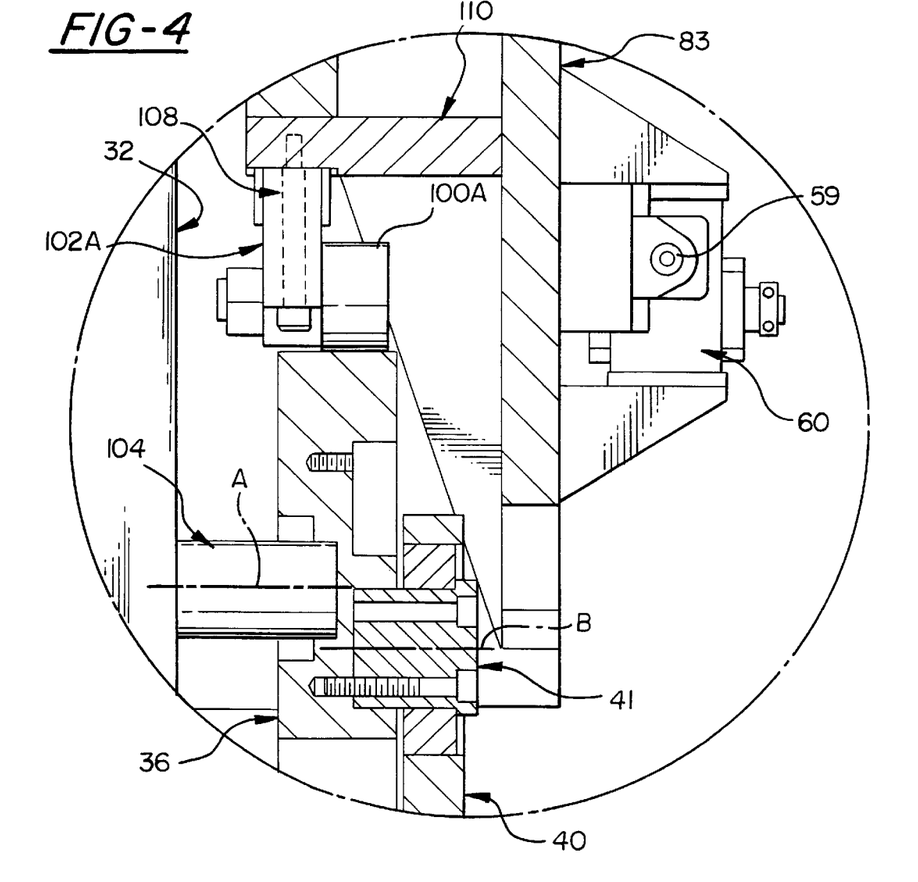
FIG. 4 is an enlarged view of the area in circle 4 in FIG. 3.
Figure 5:
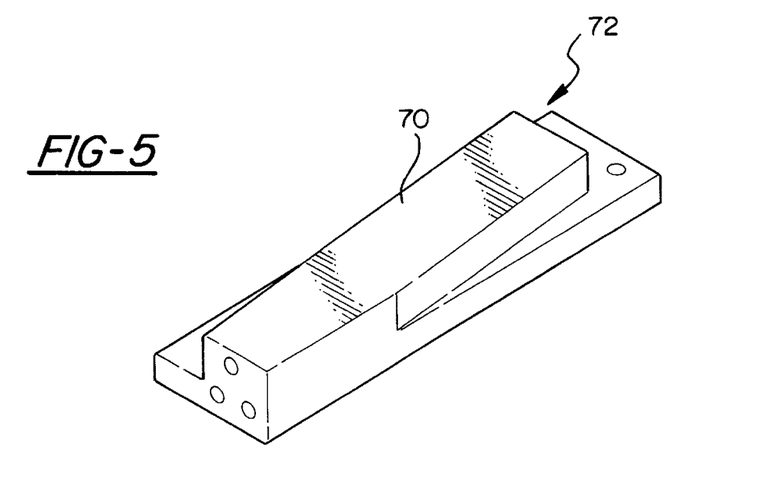
FIG. 5 is a perspective view of a cam/key piece section fixed to a slide bar used in the sheet height adjustment arrangement.

The upper platen 22 is moved by a servo motor 30 and a pair of right angle drives 32, 34 each having an output shaft 104 rotating respective pairs crank plates 36, 38 (FIG. 2). Pairs of upper links 40, 42 are rotationally connected at one end respectively to crank plates 36, 38 by a flanged pivot 41 having an axis B (FIG. 4) eccentric to the axis A of shafts 104 so as to be drawn up and down with rotation of the crank plates 36, 38 by shafts 104.

The other end of the links 40, 42 are pivotally connected to the upper platen 22 so as to be drawn up and down in the linear guides 25 as shafts 104 are rotated unidirectionally. Thus, reversing of the drive motor 30 is not required.

The lower platen 26 is similarly driven by a unidirectional servo motor 44 driving a pair of right angle drives 46, 48 each rotating pairs of crank plates 50, 52, which in turn drive pairs of lower links 54, 56 respectively connected to the crank plates 50, 52 at eccentric locations, and to the lower platen 26 in similar fashion to the connection of the upper platen 24.

According to one aspect of the present invention, the closed or shut height distance is capable of being adjusted, by mounting the press frame top assembly 16 and these components mounted thereto to be vertically displaceable with respect to the remainder of the press components. This positions the upper platen 22 a variable distance from the lower platen 26, thereby enabling the shut height adjustment.

The displacement of the top assembly 16 is carried out by controllable operation of a single drive motor 58 mounted at one corner of the top assembly 16. The drive motor 58 rotates a shaft 59 which drives a pair of right angle drive units 60, 62 mounted to front plate 83 of the top assembly 16.

Figure 9:
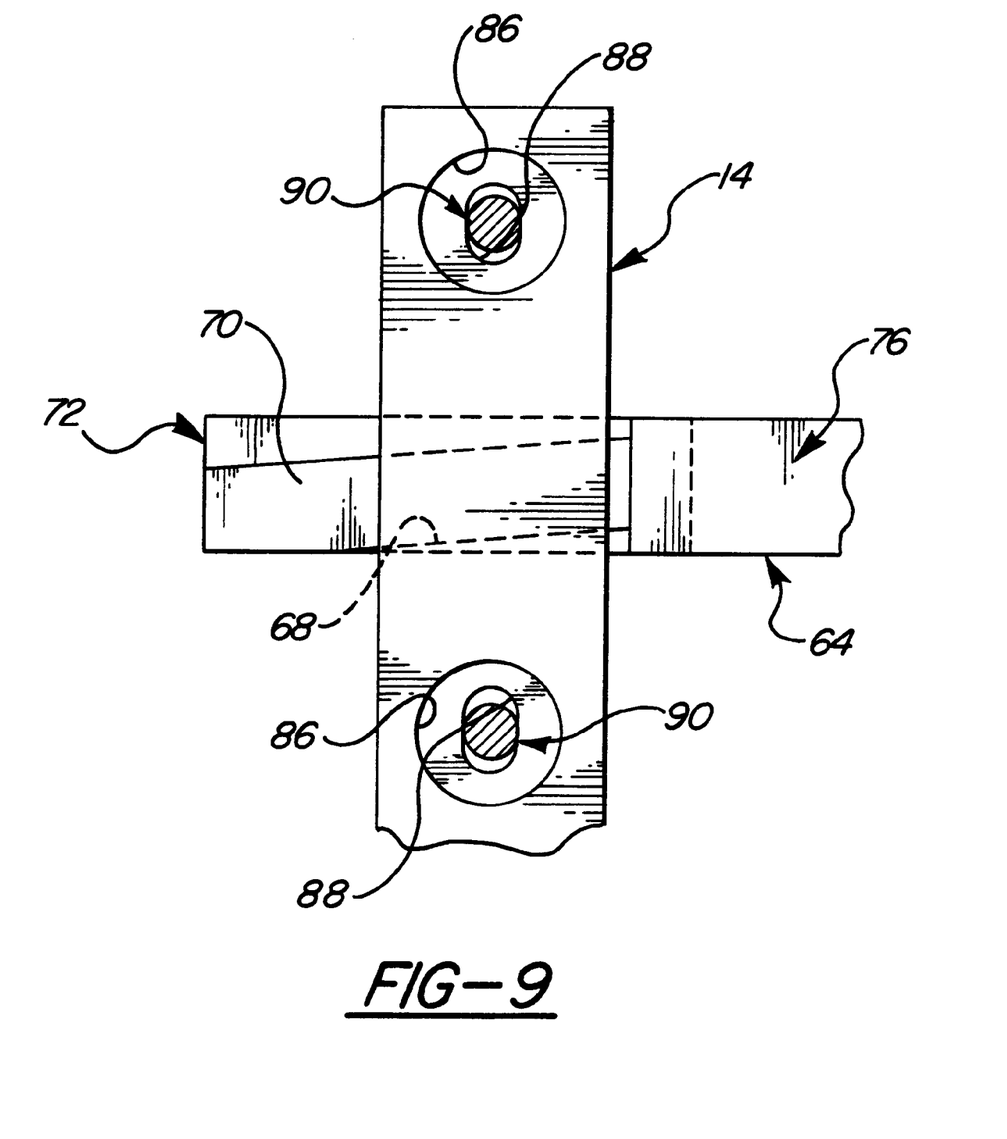
FIG. 9 is an enlarged fragmentary end view of one of the frame posts and slide bar, showing engagement of an angled cam/key portion of the slide bar with an angled slot in the post.

The right angle drive units 60, 62 are each arranged to variably position one of a pair of slide bar assemblies 64, 66 extended across opposite ends of the top assembly 16. The posts 14 each have a guide feature comprising an inclined slot 68 formed in the inside top face which slidably receives a mating angled cam/key portion 70 of an end piece 72 included in the slide bar assembly 64, 66 (FIG. 9). Connector bars 76, 78 connect each of the end pieces 72, 74 together in pairs, the end pieces 72, 74 slidable in horizontal guide features comprising slots 80 in the exposed face of each of opposite end plates 82, 84 forming part of the top assembly 16. The end pieces 72 and slots 56,80 create a positive interlock between the posts 14 and top assembly 16 preventing relative vertical movement in all positions in the slots 56, 80.

Figure 6:
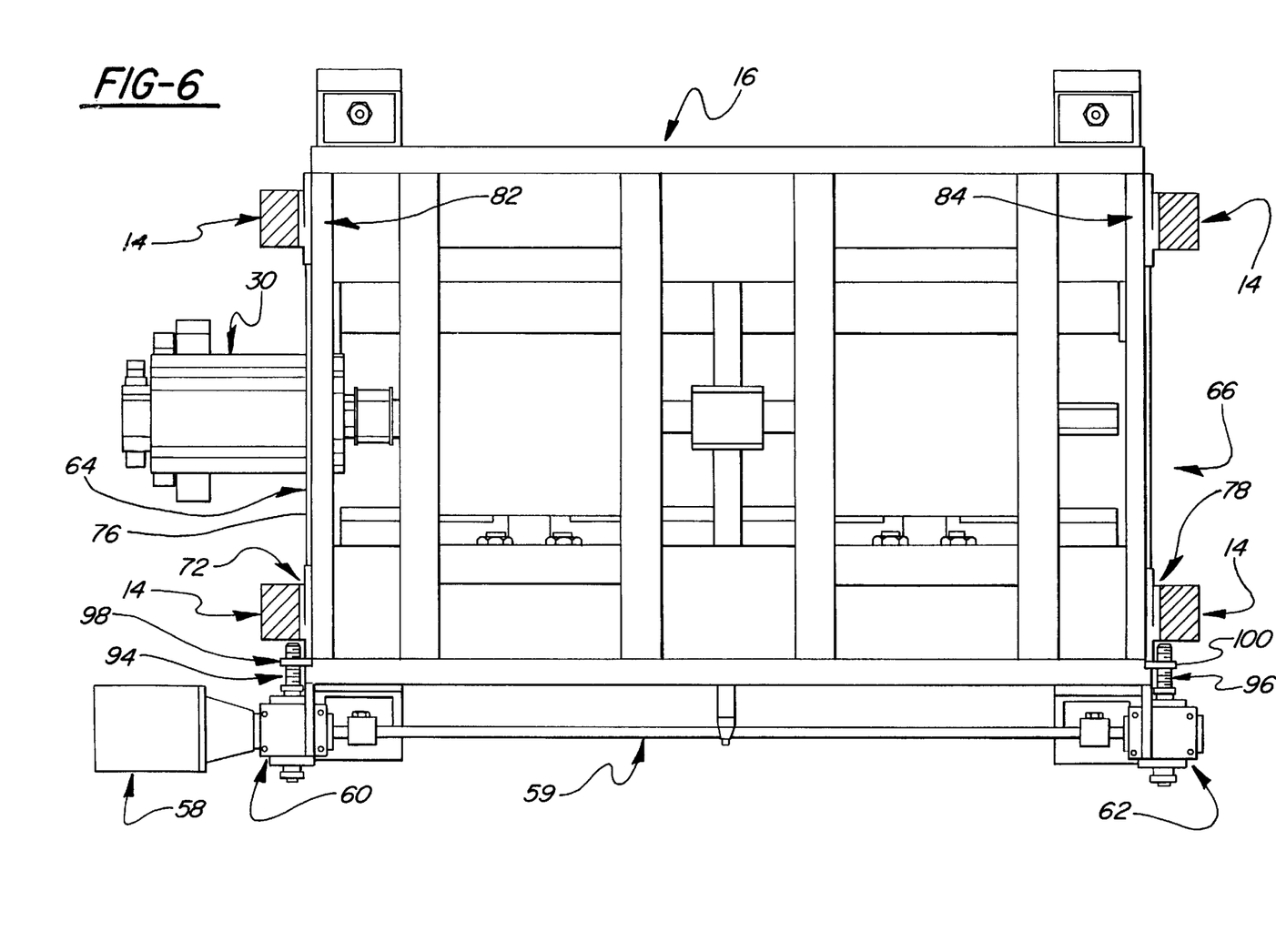
FIG. 6 is a plan view of the press shown in FIG. 1.
Figure 8:
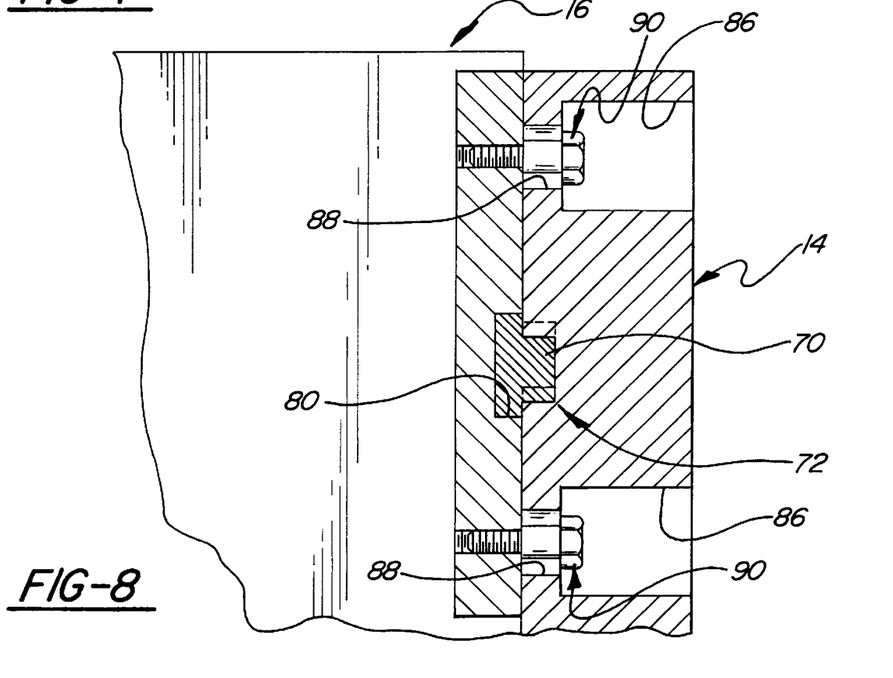
FIG. 8 is an enlarged fragmentary view in partial section of the connection between the post, slide bar, and end plate of the press frame.

The posts 14 have enlarged counterbores 86 aligned with elongated holes 88 (FIGS. 8, 9) which receive shoulder bolts 90. A threaded output shaft 94, 96 of each right angle drive unit 60, 62 is threadedly engaged with a threaded bore in a respective driver plate 98, 100 (FIG. 6) attached to slide bar assemblies 64, 66.

Thus, when motor 58 is operated, the slide bar assemblies are moved longitudinally in either direction (depending on the direction of motor rotation). This causes the angled cam/key portions 70 to act on the sidewalls of the associated slots 68 to cam the top assembly up or down, shifting the upper platen 24 vertically with respect to the lower platen 26. The elongated holes 88 accommodate this relative movement by allowing sliding of the shoulder bolts 90 in the holes 88. When the motor 58 is not operated, the cam/key portions 70 positively key the top assembly 16 to the posts 14.

A suitable electronic feedback and display (not shown) can be provided for the adjustment drive arrangement, which can be activated while the machine is operated for easier set up procedures.

The crank plates 36, 38 are each supported by pairs of rollers 100A, 100B mounted on spaced apart holder blocks 102A, 102B so as to engage the perimeter of the associated crank plate 36, 38, on either side of the axis of rotation thereof. The rollers 100A, 100B are located above the axis of rotation A of the upper platen crank plates 36, 38 and below the axis of rotation of lower platen crank plates 50, 52 so as to support shafts 104 (FIG. 4) of the right angle units 32, 34 connected to drive the crank plates 36, 38 against bending loads exerted on the crank plates 36, 38 during the forming process.

Figure 7:
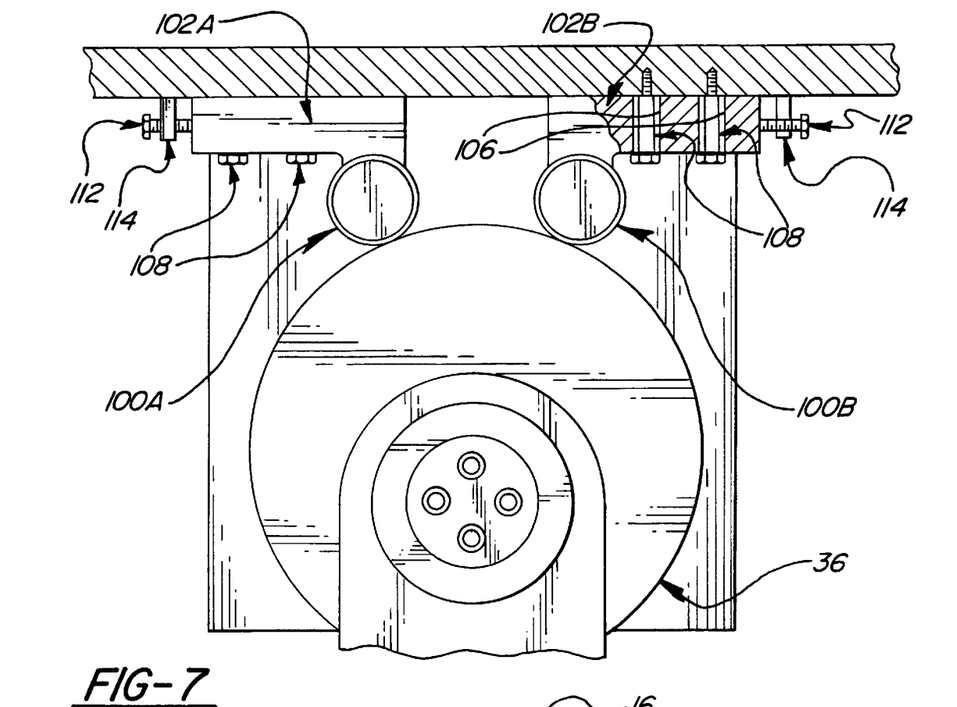
FIG. 7 is a fragmentary end view of a crank plate and support rollers, showing the adjustment of the rollers for proper engagement.

The rollers 100A, 100B are adjustable towards or away from each other so as to insure engagement with perimeter surface of the crank plates 36, 38. This is accomplished by slots 106 in the support blocks 102A, 102B and shoulder bolts 108 allowing sliding adjustment movement of the blocks 102A, 102B on plates 110 fixed to the press frame tap the assembly 16. An adjusting bolt 112 threaded through a fixed plate 114 engages the end of the block 102A or 102B to advance the same until the associated roller 100A or 100B firmly engages the perimeter of the crank plate 36 or 38.

We claim:

1. In a press of the type having upper and lower platens moved together on a press frame to a shut height comprised of a minimum distance between said upper and lower platens by a press drive mechanism, the improvement of a shut height adjustment arrangement comprising:

a generally rectangular four sided press frame top assembly holding said upper platen, said top assembly vertically adjustably positionable with respect to a lower part of said press frame holding said lower platen;

said shut height adjustment arrangement comprising a pair of slide bar assemblies each having cam/key portions, guide features at a top portion of the lower part of said press frame each aligned with a guide feature on each of opposite sides of said top assembly, said cam/key portions each slidably mounted between said guide feature at the top portion of said lower part of said press frame and the respective guide feature of said top assembly so as to positively interlock said top assembly against relative vertical movement on said lower part of said frame in all slidable positions of said cam/key portions;

said cam/key portions having surfaces mating with surfaces of said guide features for relatively shifting said top assembly vertically on said lower part of said press frame upon sliding movement of said slide bar assemblies in either direction; and drive means for selectively shifting each of said slide bar assemblies to a sliding position corresponding to a selected relative vertical position of said top assembly relatively to said lower part of said press frame to vary the shut height between said upper and lower platens.

2. The improvement according to claim 1 wherein said lower part of said press frame includes four vertical posts, said top assembly movably mounted on said four posts by a connection to each post, said cam/key portions each interlocking said top assembly to a respective post so as to vary the position of said top assembly on said posts as said cam/key portions are moved.

3. The improvement according to claim 2 wherein each of said post has an angled slot comprising said guide feature slidably receiving a respective cam/key portion.

4. The improvement according to claim 3 wherein each cam/key portion is slidably received in one of a pair of slots each located on a respective opposite side of said frame top assembly, said slots aligned with respect to said angled slots in each associated post on a respective side of said frame top assembly.

5. The improvement according to claim 3 wherein said drive means includes a motor drivingly connected to each slide bar assembly causing all of said cam/key portions to move together in unison with each other to vary the position of said frame top assembly and upper platen on said posts.

\* \* \* \* \*